(12) United States Patent
Nakanishi

(10) Patent No.: US 6,585,196 B2
(45) Date of Patent: Jul. 1, 2003

(54) FASTENER FOR PIPE OR THE LIKE

(75) Inventor: Hideaki Nakanishi, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/158,697

(22) Filed: May 30, 2002

(65) Prior Publication Data

US 2003/0010874 A1 Jan. 16, 2003

(30) Foreign Application Priority Data

May 30, 2001 (JP) ........................................ 2001-161856

(51) Int. Cl.⁷ ............................................... F16L 3/227
(52) U.S. Cl. ..................... 248/68.1; 248/62; 248/74.2
(58) Field of Search ............................. 248/58, 60, 62, 248/68.1, 72, 73, 74.1, 74.2, 603, 604, 634; 174/97; 24/336, 339

(56) References Cited

U.S. PATENT DOCUMENTS

| | | | |
|---|---|---|---|
| 5,170,984 A | * 12/1992 | Ruckwardt | 248/635 |
| 5,190,251 A | * 3/1993 | Bodo | 248/73 |
| 5,458,303 A | * 10/1995 | Ruckwardt | 248/74.2 |
| 5,954,302 A | * 9/1999 | Robertson et al. | 248/74.3 |
| 6,070,836 A | * 6/2000 | Battie et al. | 248/68.1 |
| 6,152,406 A | * 11/2000 | Denndou | 248/68.1 |
| 6,206,330 B1 | * 3/2001 | Oi et al. | 248/68.1 |
| 6,216,986 B1 | * 4/2001 | Kwilosz | 248/74.1 |
| 6,241,198 B1 | * 6/2001 | Maruyama | 248/49 |
| 6,290,201 B1 | * 9/2001 | Kanie et al. | 248/636 |

OTHER PUBLICATIONS

U.S. Patent Application Publication No. US 2001/0019091, Publication date: Sep. 6, 2001, Inventor: Nakanishi.*
Patent Abstract of Japan; Publication No. 09250517 A; Sep. 1997; Inventor—Oi Shigeo et al.

* cited by examiner

Primary Examiner—Ramon O. Ramirez
Assistant Examiner—Jon Szumny
(74) Attorney, Agent, or Firm—Harness, Dickey & Pierce, P.L.C.

(57) ABSTRACT

A fastener (1) comprises a base portion (6) a pipe holding portion (7) connected integrally with the base portion, a stud engagement portion (10) provided at the base portion and adapted to engage with a stud standing on a car body panel, and a support portion (14) for supporting the stud engagement portion (10). The fastener (1) further comprises: a support portion (14) formed on the base portion and outside the stud engagement portion for supporting the stud engagement portion (10); first thin connection pieces (27) provided at a plurality of circumferentially spaced positions between the inner periphery of the support portion and the outer periphery of the stud engagement portion to connect the support portion to the stud engagement portion in the vicinity of an inlet (15) of a stud receiving hole formed in the stud engagement portion; and second thin connection pieces (29) provided at a plurality of circumferentially spaced positions between the inner periphery of the support portion and the outer periphery of the stud engagement portion to connect the support portion to the stud engagement portion at a location away from the inlet in the axial direction of the stud receiving hole, whereby the stud engagement portion is connected with the support portion by only both the first and second thin connection pieces.

8 Claims, 7 Drawing Sheets

FASTENER FOR PIPE OR THE LIKE

FIELD OF THE INVENTION

The present invention relates to a fastener for mounting an elongated article such as a pipe or wire harness on a workpiece such as a car body panel. In particular, the present invention relates to a fastener for a pipe or the like, capable of being engaged with a stud standing on a workpiece such as a car body panel to mounting an elongated article such as a pipe held in a pipe holding portion of the fastener to the workpiece.

BACKGROUND OF THE INVENTION

In a support structure for attaching a long article such as a fuel pipe, brake oil pipe or wire harness of a car, it is desired to prevent vibration from being transmitted from the pipe or the like to a car body panel or the like or from the body panel or the like to the pipe or the like. Heretofore, for the purpose of such vibration insulation, there has been typically employed a technique of attaching the pipe or the like to a fastener with winding a rubber vibration insulator around the pipe or the like. One such example includes a fastener for a pipe or the like described in Japanese Patent Laid-Open No. 9-250517. In this fastener, a vibration insulation characteristic is achieved by combining a flexible plastic material with a rigid plastic material. This technique is essentially required to use two kinds of plastic materials, resulting in increased cost and weight. Japanese Patent Laid-Open No. 7-310866 discloses a pipe fastener in which a flexible bridge member is provided between a stud engagement portion and a pipe holding portion to prevent vibration transmission between the stud engagement portion and the pipe holding portion. Japanese Patent Laid-Open No. 61-116189 also discloses a pipe fastener in which a flexible strip is provided between a stud engagement portion and pipe holding portion to prevent vibration transmission between the stud engagement portion and the pipe holding portion. These fasteners can be formed of a single plastic material, and thereby the problem of cost overrun would be solved. However, somewhat specified configuration of these fasteners can cause a problem of poor versatility, because their holding force is not sufficient to hold three or more of pipes or their molding process is complicated.

Japanese Patent Laid-Open Nos. 7-91570 and 9-126357 disclose a fastener for a pipe or the like, which includes a base portion, a pipe holding portion connected integrally with the base portion, and a stud engagement portion provided at the base portion and adapted to engage with a stud standing on a workpiece such as a car body panel, wherein engaging the stud engagement portion with the stud allows an elongated article such as a pipe held in the pipe holding portion to be mounted on the workpiece. This fastener is intended to reduce the number and total sectional area of connection portions between the stud engagement portion and the pipe holding portion to prevent vibration transmission between the stud engagement portion and the pipe holding portion.

The fastener in Japanese Patent Laid-Open Nos. 7-91570 and 9-126357 would provide a certain advantageous result in terms of preventing the vibration transmission between the stud engagement portion and the pipe holding portion. Further, the fastener could be formed in a suitable configuration for holding three or more of pipes. However, there is a problem of slightly low strength in the connection portions between the stud engagement portion and the pipe holding portion, because it is too enhanced to prevent the vibration transmission between the stud engagement portion and the pipe holding portion.

Therefore, in a fastener for a pipe or the like, having a stud engagement portion through which an elongated article such as a pipe held by the fastener is mounted on a workpiece such as a car body panel, it is an object of the present invention to enable the fastener to maintain high connection strength between the stud engagement portion and a pipe holding portion of the fastener while keeping a sufficient isolating property for vibration transmitted from the pipe or the like to the car body (or vise versa).

SUMMARY OF THE INVENTION

In order to achieve the above object, the present invention provides a fastener for a pipe or the like, comprising a base portion, a pipe holding portion connected integrally with the base portion, and a stud engagement portion disposed in the base portion and adapted to engage with a stud standing on a workpiece such as a car body panel, wherein engaging of the stud engagement portion with the stud allows an elongated article such as a pipe held in the pipe holding portion to be mounted on the workpiece. In the present invention, the fastener further comprises: a support portion formed on the base portion and outside the stud engagement portion for supporting the stud engagement portion; first thin connection pieces provided at a plurality of circumferentially spaced positions between the inner periphery of the support portion and the outer periphery of the stud engagement portion to connect the support portion to the stud engagement portion in the vicinity of an inlet of a stud receiving hole formed in the stud engagement portion; and second thin connection pieces provided at a plurality of circumferentially spaced positions between the inner periphery of the support portion and the outer periphery of the stud engagement portion to connect the support portion to the stud engagement portion at a location away from the inlet in the axial direction of the stud receiving hole, whereby the stud engagement portion is connected with the support portion by only both the first and second thin connection pieces.

As above, the stud engagement portion is connected with the support portion in the base portion through only both the first thin connection pieces adjacent to the inlet and the second thin connection pieces located away from the inlet. Thus, vibration as transmitted from the pipe or the like to the body panel or the like (or vise versa) can pass through only the first and second thin connection pieces provided between the support portion and the stud engagement portion, and further these thin connection pieces hardly transmit the vibration. This provides and maintains high sufficient isolation characteristic or property of vibration from the support portion to the stud engagement portion (or vise versa). Further, the first thin connection pieces and the second thin connection pieces located at different positions from the first thin connection pieces allow the stud engagement portion to be connected to the support portion with enhanced connection strength. Thus, the fastener can achieve and maintains high connection strength between the stud engagement portion and the pipe holding portion.

In a preferred embodiment of the present invention, the first thin connection pieces may be provided at four positions on the outer periphery of the inlet of the stud engagement portion on the side of the inlet, and the second thin connection pieces may also be provided at four positions on the outer periphery of the stud engagement portion on the opposite end to the inlet. In this fastener, each of the thin connection pieces may be formed in a plate member which has a C shape when viewed in the axial direction of the stud receiving hole with the C shaped plate member extending in the axial direction.

The aforementioned stud engagement portion may include: a pair of opposed platy side walls, each extending from the location of the inlet in a stud insertion direction and extending in the longitudinal direction of the elongated article held in the pipe holding portion; a rectangular inlet wall defining the inlet of the stud receiving hole and supporting the ends of the side walls on the inlet side; and a rectangular bottom wall supporting the end of the stud engagement portion on the opposite side to the inlet wall. Further, the support portion may include: a pair of opposed side walls provided on the outer side of the side walls of the stud engagement portion to surround the stud engagement portion; a rectangular inlet ring for supporting the side walls of the support portion and surrounding an inlet region of the stud engagement portion on the side of the inlet; and a rectangular bottom ring for supporting the side walls of the support portion and surrounding the bottom wall of the stud engagement portion. In that case, the first thin connection pieces connect the inlet wall of the stud engagement portion with the inlet ring of the support portion at four discrete positions adjacent to the side walls of the stud engagement portion, and the second thin connection pieces connect the bottom wall of the stud engagement portion with the bottom ring of the support portion at four discrete positions adjacent to the side walls of the stud engagement portion.

In the above fastener, each of the side walls of the stud engagement portion may includes a stopper located adjacent to the inlet ring of the support portion to prevent the support portion from moving in the direction of getting out of the stud to the extent of causing the destruction of the thin connection pieces. Each of the stoppers may have a configuration extending outward in a direction orthogonal to the axial direction of the stud receiving hole to prevent the support portion from getting out of the stud engagement portion even if the thin connection pieces are broken. Each of the side walls of the stud engagement portion may further includes an additional or second stopper located adjacent to the bottom ring of the support portion to prevent the support portion from moving in the stud insertion direction to the extent of causing the destruction of the thin connection pieces. This allows the destruction of the thin connection pieces to be avoided even if excessive force acts on the support portion in the direction of getting out of the stud or in the stud insertion direction. Further, each of the stoppers may be located to receive each of the thin connection pieces. This provides enhanced stopper function to restrict the movement of the thin connection pieces as well as the support portion.

DETAILED DESCRIPTION OF THE PREFERRED EMBODIMENTS

Figure 1:
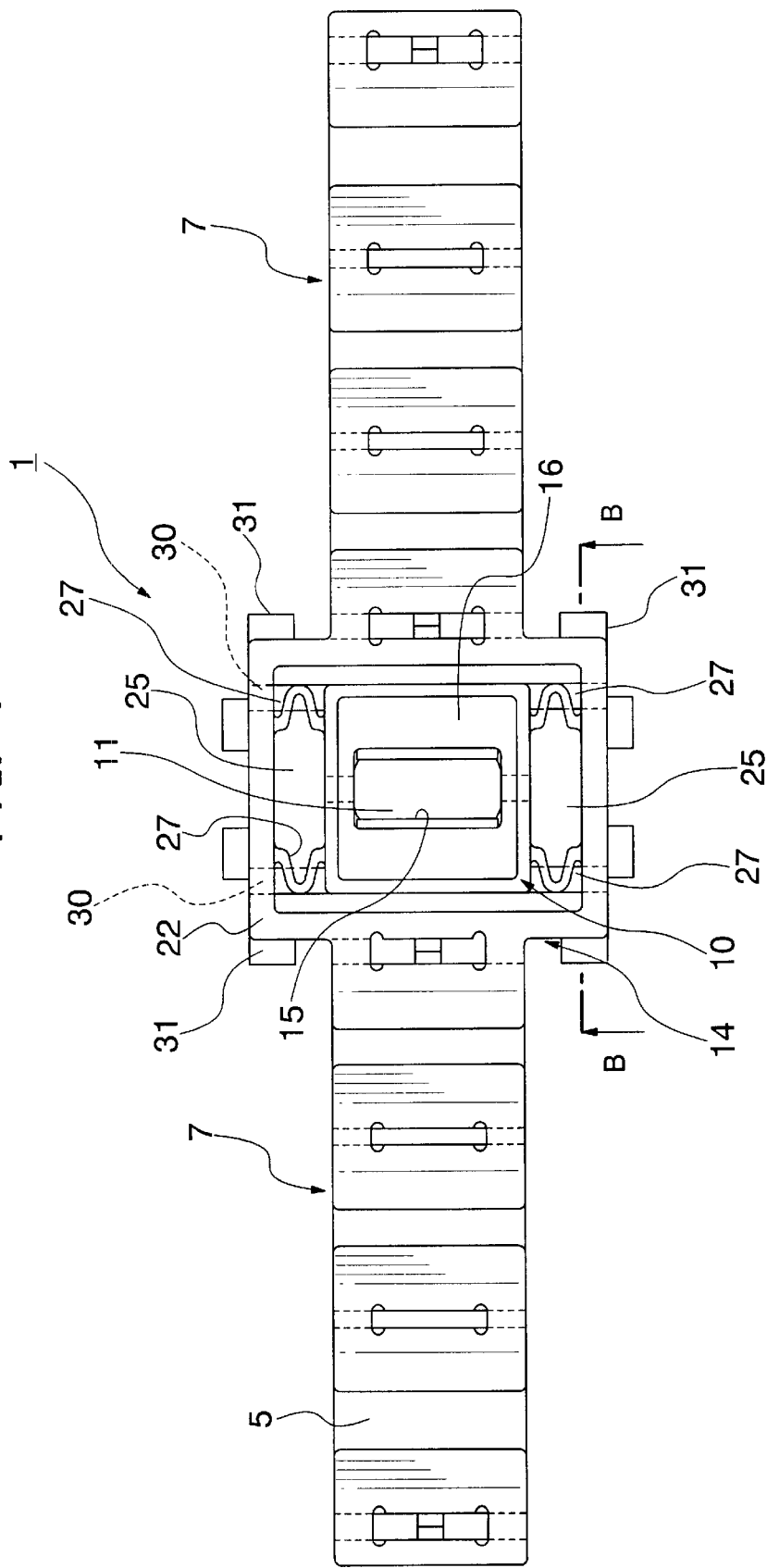
FIG. 1 is a top plan view of a fastener for a pipe or the like, according to a first embodiment of the present invention.
Figure 2:
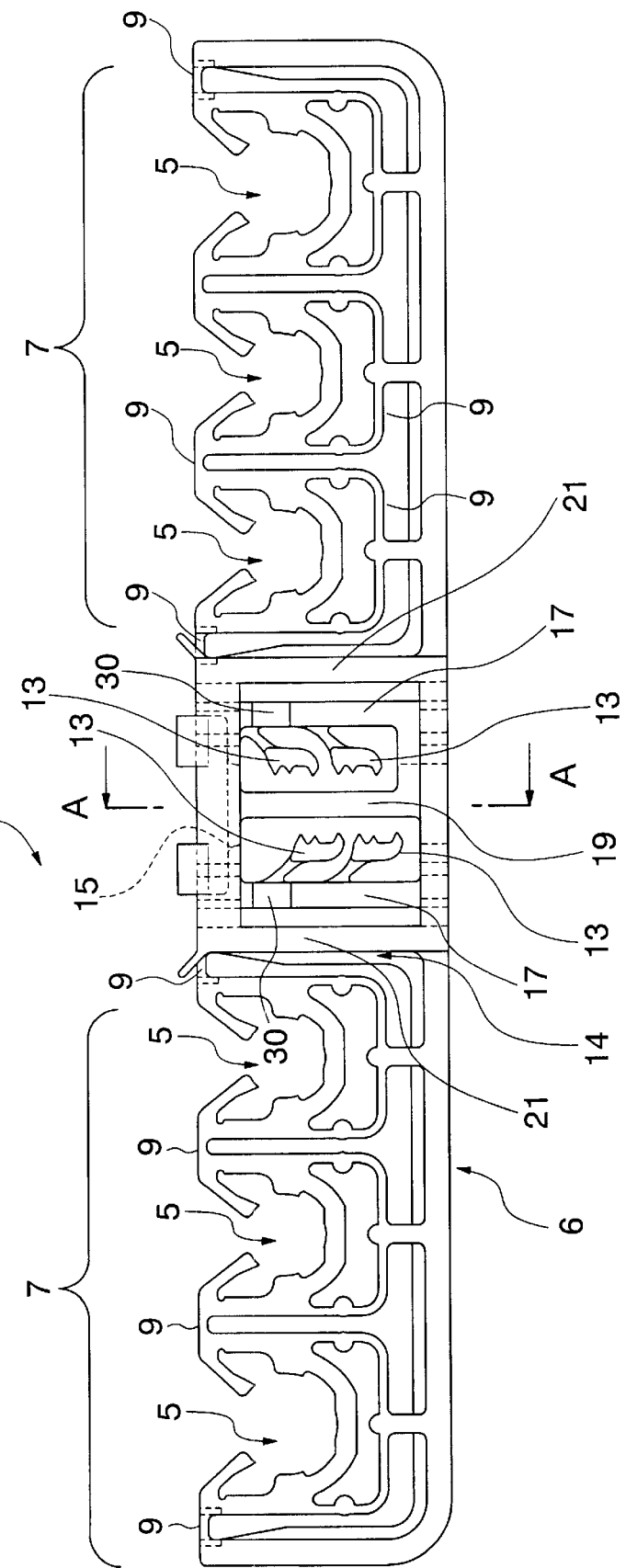
FIG. 2 is a front view of the fastener of FIG. 1.
Figure 3:
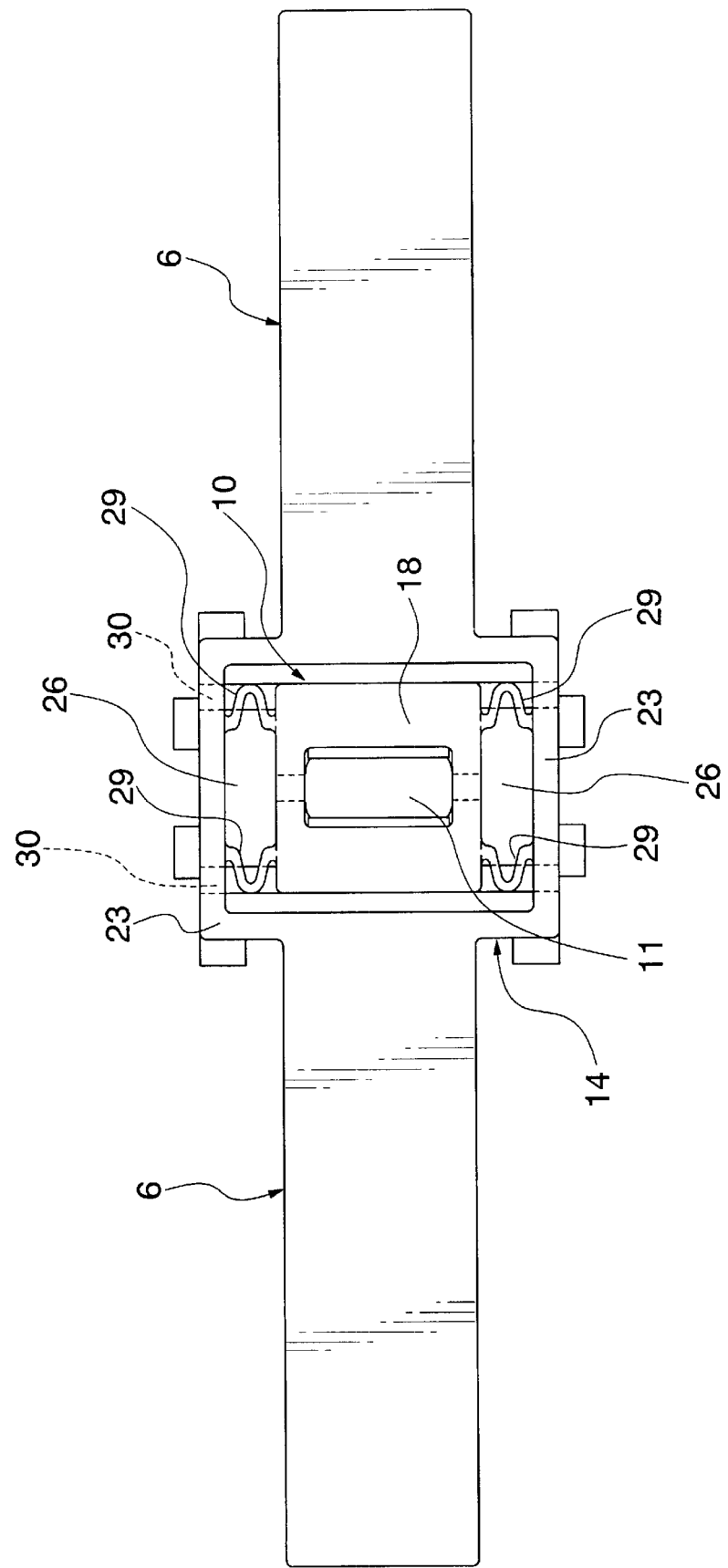
FIG. 3 is a bottom view of the fastener of FIG. 1.
Figure 4:
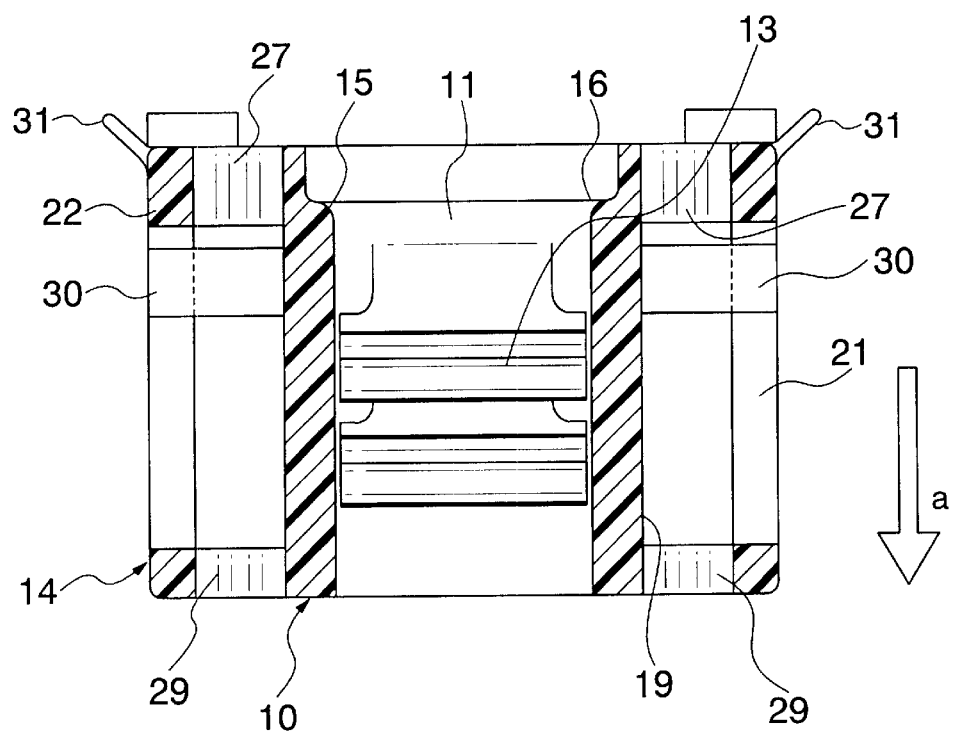
FIG. 4 is a sectional view of the fastener taken along the line A—A of FIG. 2.
Figure 5:
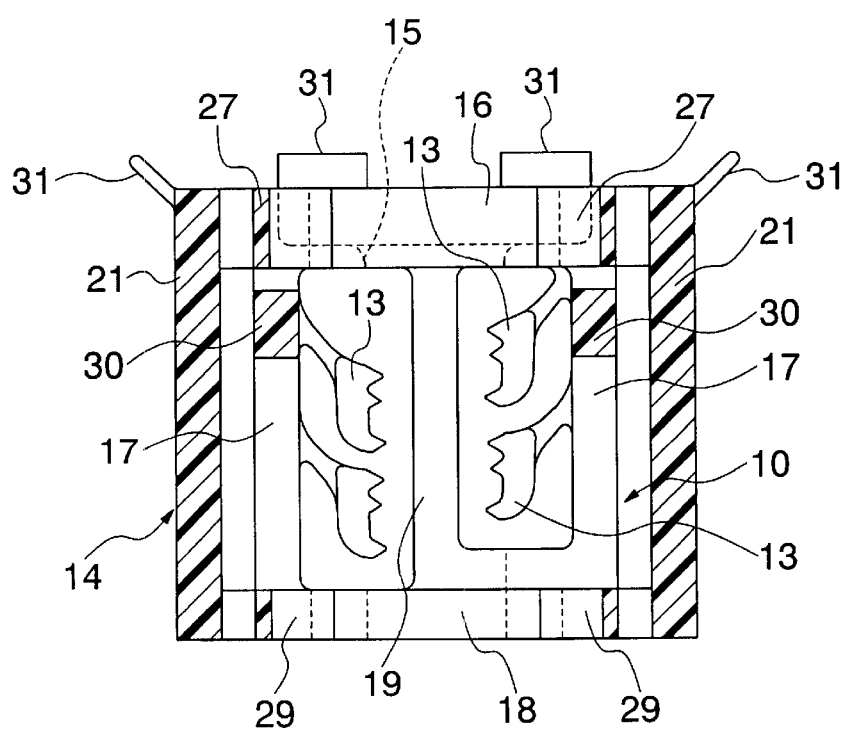
FIG. 5 is a sectional view of the fastener taken along the line B—B of FIG. 1.
Figure 6:
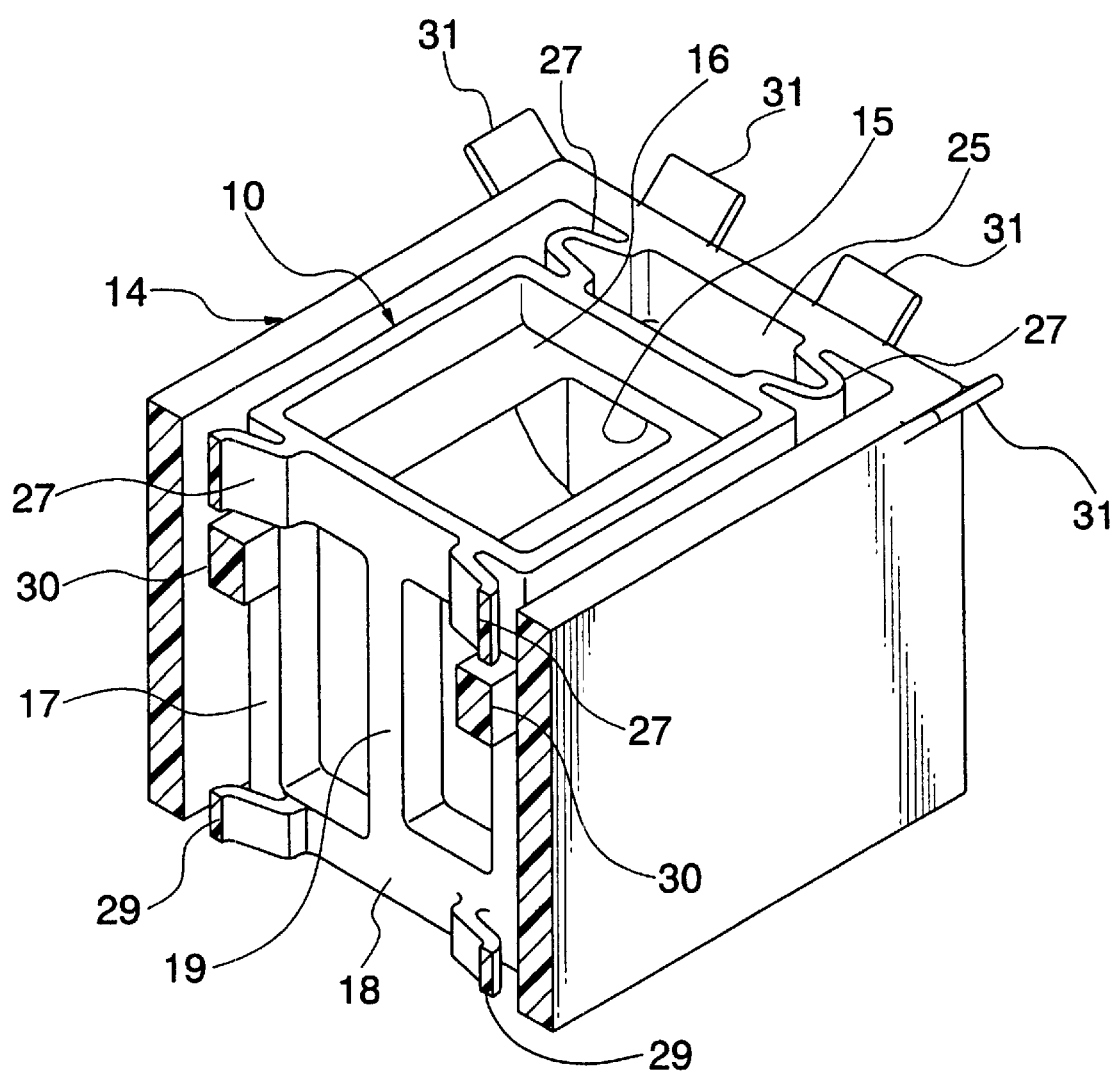
FIG. 6 is a perspective view showing the fastener with the section of taken along the line B—B of FIG. 1.
Figure 7:
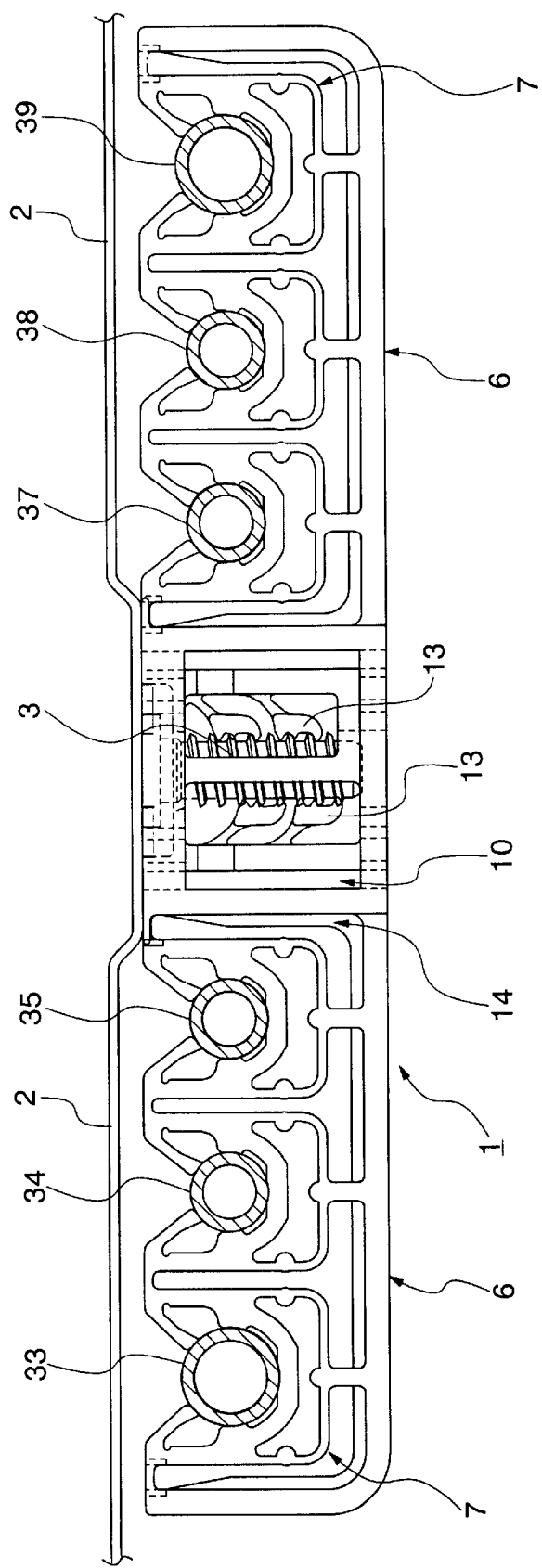
FIG. 7 is a front view showing the state that a plurality of pipes are mounted on a car body panel by using the fastener of FIG. 1.

With reference to the drawings, embodiments of the present invention will now be described. FIGS. 1 to 7 show a fastener 1 for a pipe or the like, according a first embodiment of the present invention. FIGS. 1, 2 and 3 are a top plan view, front view and bottom view of the fastener 1, respectively. FIG. 4 is a sectional view taken along the line A—A of FIG. 2, FIG. 5 being a sectional view taken along the line B—B of FIG. 1, and FIG. 6 is a perspective view showing the fastener which is sectioned along the line B—B of FIG. 1. FIG. 7 shows the state that the fastener 1 is engaged with a stud 3 standing on a car body panel 2 as a workpiece to mount various pipes on the body panel 2. The fastener 1 for a pipe or the like according to the present invention is an integrally formed product made of a plastic material. As shown in FIGS. 1 to 3, the fastener 1 comprises a base portion 6 and a pipe holding portion 7 connected integrally with both sides of the base portion 6. The base portion 6 is formed in an elongated configuration for allowing the pipe holding portion 7 to hold a number of pipes in parallel. A stud engagement portion 10 adapted to engage with the stud is provided at the center region of the base portion. The pipe holding portion 7 is formed with pipe receiving portions 5, each formed in a configuration allowing a pipe to be pushed thereinto and held therewithin. The pipe holding portion 7 also includes thin connection portions 9, each formed in a configuration having a minimized connection area so as not to transmit vibration between the pipe receiving portions or from the pipe receiving portions to the base portion 6. Such a configuration is disclosed, for example, in Japanese Patent Laid-Open No. 2000-018433. For example, in order to mount a plurality of pipes on a car body panel, the fasteners 1 are attached at a plurality of positions on a long pipe, and are then attached, respectively, to a plurality of studs at predetermined discrete positions of the body panel.

The stud engagement portion 10 has a stud receiving hole 11 for receiving the stud 3 (FIG. 7). The stud receiving hole 11 is formed lengthwise in a direction parallel to the longitudinal direction of the pipes (the vertical direction in FIG. 1) held in the pipe holding portion 7. The stud engagement portion 10 is formed with a plurality of engagement pawls 13, each adapted to engage with threads or grooves of the stud. Each of the engagement pawls 13 is formed in a platy member extending in a direction parallel to the longitudinal direction of the stud receiving hole 11, and these platy engagement pawls 13 are oppositely disposed on both sides of the stud receiving hole 11 to make two pairs. In this manner, the stud receiving hole 11 is formed in an elongated hole, and each of the engagement pawls 13 is formed lengthwise in the longitudinal direction of the elongated hole. Thus, even if each position of the plurality of fasteners 1 attached to the pipes is deviated from the position of the corresponding stud of the body panel, each of the fasteners can cope with the deviation to adjust the attaching position adequately. For a threaded stud, the engagement pawls 13 are offset in the height direction of the fastener (the vertical direction in FIG. 2) in accordance with the thread pitch of the stud. This provides enhanced engagement force to the threads of the stud.

In the present invention, the base portion 6 is formed with a support portion 14 for supporting the stud engagement portion 10, on the outer side of the stud engagement portion 10. The support portion 14 is formed to have a high rigidity and extend perpendicularly from an elongated portion which holds the pipe holding portion 7, 7 located on both sides of the support portion, to define a main body of the base portion 6 in conjunction with the elongated portion holding the pipe holding portion. The stud engagement portion 10 to be supported by the support portion 14 includes a rectangular inlet wall 16 defining an inlet 15 of the stud receiving hole 11 (see FIGS. 2, 4 and 5), a pair of opposed side walls 17, each extending from corresponding one of both sides of the inlet wall 16 in a stud insertion direction (the downward direction in FIGS. 2 and 4), and a rectangular bottom wall 18 connecting the respective ends (the lower ends in FIGS. 2 and 4) of the side walls on the opposite side of the inlet wall 16 with each other. Each of the side walls 17, 17 is disposed on the side facing to the pipe holding portion 7, whereas no wall is provided on other sides (the front and rear sides in FIG. 2) to make a cavity. This configuration allows the pipe holding portion and the engagement pawls 13 to be formed by using a two-piece split mold. In order to prevent degradation in strength due to this cavity, columns 19 are formed in the central regions of the front and rear sides, respectively. The support portion 14 is formed to support the stud engagement portion 10 having the above configuration, from the outer side of the stud engagement portion 10.

The support portion 14 includes a pair of opposed side walls 21, 21 provided outside the side walls 17 of the stud engagement portion 10 and spaced apart from the side walls to surround the stud engagement portion 10, a rectangular inlet ring 22 for supporting the ends of the side walls 21 on the inlet side and surrounding the inlet wall 16 of the stud engagement portion with maintaining a certain distance therebetween, and a rectangular bottom ring 23 for supporting the ends of the side walls 21 on the opposite side to the inlet ring 22 and surrounding the bottom wall 18 of the stud engagement portion and the support portion with maintaining a certain distance therebetween. Thus, the support portion 14 is generally formed in a rectangular-parallelepiped box configuration, and the cavity is formed from the front side to the rear side in FIG. 2 to facilitate the molding of the stud engagement portion 10 and others. The side walls 21 and the bottom ring 23 are continuously connected to the elongated portion supporting the pipe holding portion 7 to define the main body of the base portion 6 having sufficient rigidity.

As shown in FIG. 1, between the inlet wall 16 of the stud engagement portion 10 and the inlet ring 22 of the support portion 14, large spaces 25 are defined at the upper and lower locations in FIG. 1, respectively. Further, as shown in FIG. 3, between the bottom wall 18 of the stud engagement portion and the bottom ring 23 of the support portion in the vicinity of the bottom end of the stud engagement portion away from the inlet 15, large spaces 26 are defined at the upper and lower locations in FIG. 3, respectively. Within the spaces 25, first thin connection pieces 27 are provided at four discrete positions spaced apart from each other in the circumference direction of the stud engagement portion 10, specifically in the vicinity of four corners of each of the rectangular inlet wall 16 and the rectangular inlet ring 22, to connect the inlet wall 16 of the stud engagement portion to the support potion inlet ring 22. Within the spaces 26, second thin connection pieces 29 are provided at four discrete positions spaced apart from each other in the circumference direction of the stud engagement portion 10, specifically in the vicinity of four corners of each of the rectangular bottom wall 18 and the rectangular bottom ring 23, to connect the bottom wall 18 of the stud engagement portion to the bottom ring 23 of the support potion 14. The stud engagement portion 10 is connected with the support portion 14 by only both the first connection pieces 27 and the second thin connection pieces 29. Thus, vibration from the support portion 14 to the stud engagement portion 10 (or, from the stud engagement portion to the support portion) inevitably passes through only both the first and second thin connection pieces 27 and 29. Further, since the first thin connection pieces 27 and the second thin connection pieces 29 are formed in thin and small connection pieces, and are small in number, such vibration is never transmitted at its original magnitude, and is hardly transmitted because the vibration is significantly decreased therethrough. Thus, the first and second thin connection pieces 27 and 29 provide a high vibration insulating effect.

In order to enhance the vibration isolation (or insulating) characteristic or property, each of the first and second thin connection pieces 27 and 29 is formed in a C shape when viewed from the axial direction of the stud receiving hole 11 (FIGS. 1 and 3). By virtue of this configuration, vibration energy is enhancedly attenuated in the course of transmitting the thin connection pieces because vibration cannot go straight. On the other hand, each of the thin connection pieces is intended to connect the support portion and the stud engagement portion 10 with each other, and thereby it is formed in a thin platy member extending in the axial direction of the stud receiving hole to increase its strength. Providing such thin connection pieces at a plurality (four in this embodiment) of positions around each of the inlet and bottom walls can achieve and maintain high connection strength between the stud engagement portion 10 and the support portion 14.

The side wall 17 of the stud engagement portion 10 includes stoppers 30, each located adjacent to the support portion inlet ring 22 to prevent the support portion 14 from moving in the direction of getting out of the stud to the extent of causing the destruction of the thin connection pieces 27 and 29. In FIGS. 2, 4 and 6, when an external force acts on the pipes or the like and consequently a strong force is applied to the base portion 6 in the direction of getting out of the stud (the downward direction as shown by the arrow "a" in FIG. 4), the support portion 14 simultaneously moves in the direction of getting out of the stud. By this movement, portions of the first and second thin connection pieces 27 and 29 close to the support portion 14 is dragged in the direction of getting out of the stud. On the other hand, the stud engagement portion 10 stands against the movement in the direction of getting out of the stud because it is engaging with the stud on the body panel. Thus, only the above portions of the thin connection pieces 27 and 29 close to the support portion 14 could be dragged in the direction of getting out of the stud, resulting in rupture of the thin connection pieces.

The stoppers 30 restrict the support portion 14 to move with respect to the stud engagement portion 10 in the direction of getting out of the stud. More specifically, the stoppers 30 are provided at four positions on the front and back sides of the side walls 17 of the stud engagement portion in FIG. 2. Each of the stoppers 30 extends from corresponding one of the outer surfaces of the side walls 17 of the stud engagement portion in FIG. 4 to a position immediately below the inlet ring 22 of the support portion 14. By virtue of these stoppers 30, even if the main body of the base portion 6 including the support portion 14 is applied with an excessive force in the direction of getting away from the body panel along the axis of the stud, the support portion 14 is brought into contact with the stoppers 30 and thereby cannot move with respect to the stud engagement portion 10 any more. This restricts the movement of the support portion 14 in a predetermined range so as to prevent any destruction of the thin connection pieces 27 and 29. Further, each of the stoppers 30 is disposed at a location corresponding to the first thin connection pieces 27 or at a location receiving the first thin connection pieces 27. This provides enhanced stopper function of restricting the movement of the first thin connection pieces as well as the support portion 14.

Presser pieces 31 are provided at a plurality of positions on the upper surface of the inlet ring 22 of the support portion 14. Each of the presser pieces 31 resiliently extends toward the body panel. When the support portion 14 is pushed to the body panel, the presser pieces 31 are bent to allow the fastener 1 to be mounted on the body panel without any looseness in connection.

FIG. 7 shows the state that a number of pipes are mounted on the body panel 2 or a workpiece on which an elongated article such as a pipe is mounted, by using the fastener 1. Six fuel and brake oil pipes 33 to 35 and 37 to 39 are held by the pipe holding portion 7, 7. The stud 3 is inserted into the stud engagement portion 10, and the engagement pawls 13 engage with the threads or grooves of the stud 3. In this manner, the pipes 33 to 35 and 37 to 39 are mounted on the body panel 2. The stud engagement portion 10 is connected to the support portion 14 in the vicinity of the inlet 15 and around the bottom end through the first and second thin connection pieces 27 and 29, so that the stud engagement portion 10 is connected with the support portion 14 by only both the thin connection pieces 27 and 29. This provides enhanced insulating characteristic of vibration transmitted from the pipes or the like to the body panel or the like (or vise versa), and also provides and maintains high connection strength between the stud engagement portion 10 and the support portion 14 (accordingly, the pipe holding portion).

Figure 8:
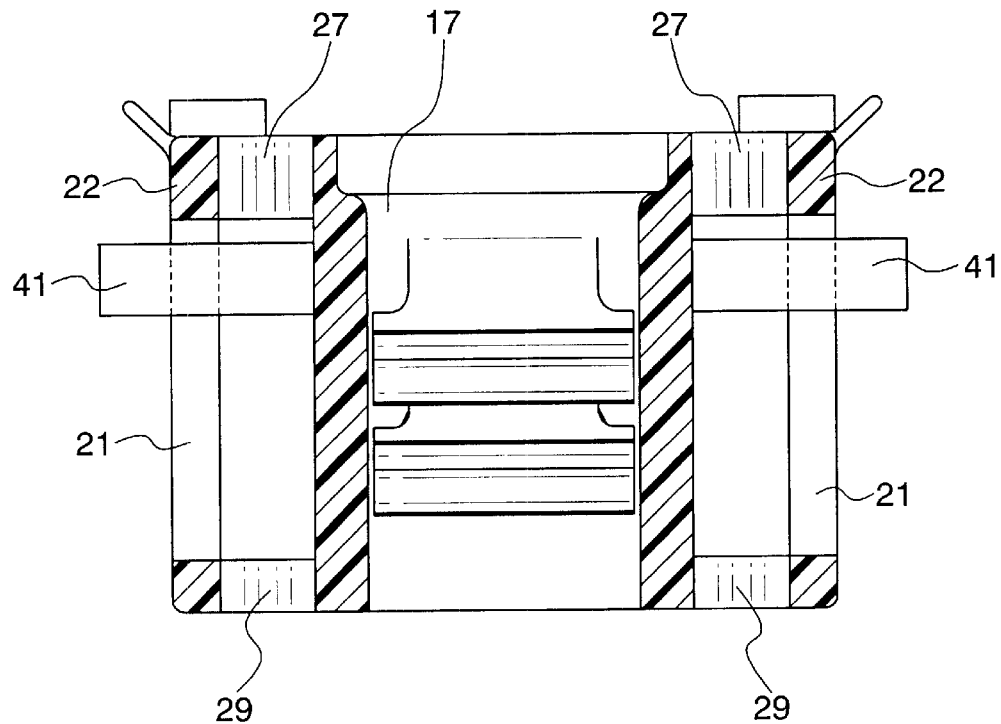
FIG. 8 is a sectional view, corresponding to FIG. 4, of a fastener according to a second embodiment of the present invention.

FIG. 8 shows a second embodiment having modified stoppers 41. Each of the modified stoppers 41 has a configuration extending outward from the corresponding one of the side wall outer surfaces of the stud engagement portion in a direction orthogonal to the axial direction of the stud receiving hole, and protrudes outside the corresponding one of the side walls of the support portion. This prevents the support portion 14 from getting out of the stud engagement portion 10 even if the thin connection pieces 27, 29 are broken to disconnect the stud engagement portion 10 from the support portion 14.

Figure 9:
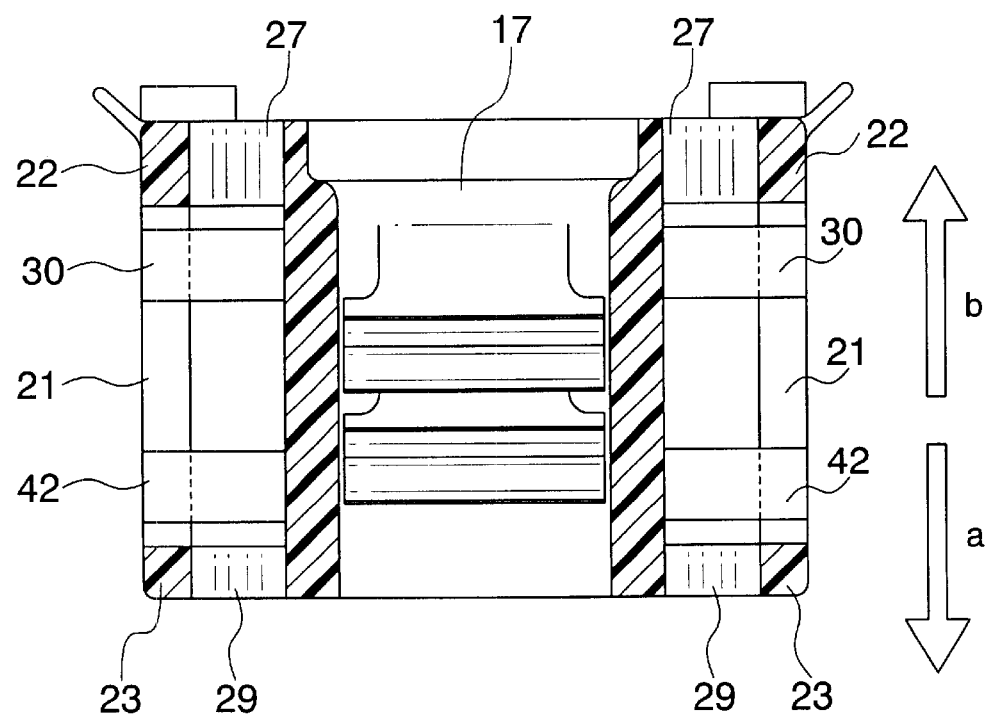
FIG. 9 is a sectional view, corresponding to FIG. 4, of a fastener according to a third embodiment of the present invention.

FIG. 9 shows a third embodiment. In this embodiment, each of the side walls of the stud engagement portion 10 on the bottom end side thereof includes an additional or second stopper 42, in addition to the stoppers 30 which are provided in the vicinity of the inlet 15 of the stud engagement portion 10. The additional stoppers 42 are located adjacent to the bottom ring 23 of the support portion to prevent the support portion 14 from moving in the stud insertion direction (the direction of the arrow "b") to the extent of causing the destruction of the thin connection pieces 27, 29. This allows the destruction of the thin connection pieces 27, 29 to be avoided even if excessive force acts on the support portion 14 in the direction of getting out of the stud (the direction of the arrow "a") or in the stud insertion direction (the direction of the arrow "b"). The stoppers 42 are provided at four positions in connection with the stoppers 30.

In a fastener for a pipe or the like, according to the present invention, the stud engagement potion is connected with the support portion of the base portion by only both the first thin connection pieces adjacent to the inlet and the second thin connection pieces located away from the inlet. Thus, vibration as transmitted from the pipe or the like to the car body panel or the like (or vise versa) can pass through only the first and second thin connection pieces provided between the support portion and the stud engagement portion, and these thin connection pieces hardly transmit the vibration. This provides and maintains high isolation characteristic of vibration from the support portion to the stud engagement portion (or vise versa). Further, the first thin connection pieces and the second thin connection pieces located at different positions from the first thin connection pieces allow the stud engagement portion to be connected to the support portion with enhanced connection strength. Thus, the fastener can achieve and maintain high connection strength between the stud engagement portion and the pipe holding portion.

I claim:

1. A fastener for a pipe or the like, comprising a base portion, a pipe holding portion connected integrally with said base portion, and a stud engagement portion disposed in said base portion and adapted to engage with a stud standing on a workpiece such as a car body panel, wherein engaging of said stud engagement portion with said stud allows an elongated article such as a pipe held in said pipe holding portion to be mounted on said workpiece, said fastener further comprising:

a support portion formed on said base portion and outside said stud engagement portion for supporting said stud engagement portion;

first thin connection pieces provided at a plurality of circumferentially spaced positions between the inner periphery of said support portion and the outer periphery of said stud engagement portion to connect said support portion to said stud engagement portion in the vicinity of an inlet of a stud receiving hole formed in said stud engagement portion; and second thin connection pieces provided at a plurality of circumferentially spaced positions between the inner periphery of said support portion and the outer periphery of said stud engagement portion to connect said support portion to said stud engagement portion at a location away from said inlet in the axial direction of said stud receiving hole, whereby said stud engagement portion is connected with said support portion by only both said first and second thin connection pieces.

2. The fastener as defined in claim 1, wherein said first thin connection pieces are provided at four positions on the outer periphery of the inlet of said stud engagement portion on the side of said inlet, and said second thin connection pieces are provided at four positions on the outer periphery of the opposite end of said stud engagement portion to said inlet.

3. The fastener as defined in claim 2, wherein each of said thin connection pieces is formed in a plate member which has a C shape when viewed in the axial direction of said stud receiving hole with said C shaped plate member having a width extending in said axial direction.

4. The fastener as defined in claim 1, wherein said stud engagement portion includes a pair of opposed platy side walls, each extending from the location of said inlet in a stud insertion direction and extending in the longitudinal direction of the elongated article held in said pipe holding portion; a rectangular inlet wall defining said inlet of said stud receiving hole and supporting the ends of said side walls at the inlet side thereof; and a rectangular bottom wall supporting the end of said stud engagement portion at the opposite side to said inlet wall, and said support portion includes a pair of opposed side walls provided on the outer sides of the side walls of said stud engagement portion to surround said stud engagement portion; a rectangular inlet ring for supporting the side walls of said support portion and surrounding the inlet of said stud engagement portion; and a rectangular bottom ring for supporting the side walls of said support portion and surrounding the bottom wall of said stud engagement portion, and wherein said first thin connection pieces connect the inlet wall of said stud engagement portion with the inlet ring of said support portion at four discrete positions adjacent to the side walls of said stud engagement portion, and said second thin connection pieces connect the bottom wall of said stud engagement portion with the bottom ring of said support portion at four discrete positions adjacent to the side walls of said stud engagement portion.

5. The fastener as defined in claim 4, wherein each of said side walls of said stud engagement portion includes a stopper located adjacent to the inlet ring of said support portion to prevent said support portion from moving in the direction of getting out of said stud to the extent of causing the destruction of said thin connection pieces.

6. The fastener as defined in claim 5, wherein each of said stoppers has a configuration extending outward in a direction orthogonal to the axial direction of said stud receiving hole.

7. The fastener as defined in claim 5, wherein each of said side walls of said stud engagement portion includes an additional or second stopper located adjacent to the bottom ring of said support portion to prevent said support portion from moving in the stud insertion direction to the extent of causing the destruction of said thin connection pieces.

8. The fastener as defined in claim 7, wherein each of said stoppers is located to receive each of said thin connection pieces.

* * * * *